(No Model.)
L. D. HOOPER
GATE.
No. 593,939. Patented Nov. 16, 1897.
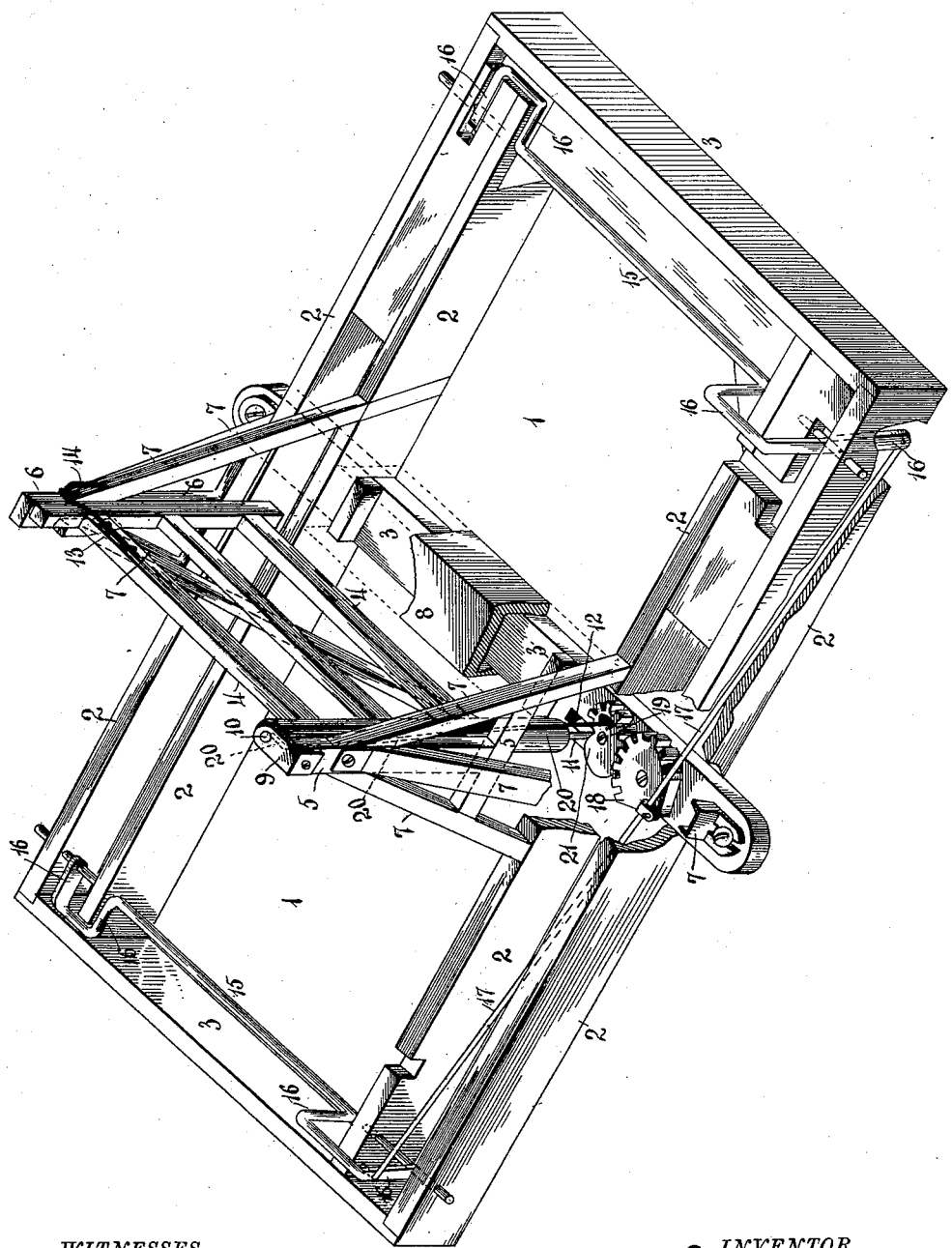
WITNESSES
W. E. Allen.
J. G. Tabler.
INVENTOR.
Lorenzo D. Hooper
by John Wedderburn
Attorney

UNITED STATES PATENT OFFICE.

LORENZO D. HOOPER, OF COFFEYVILLE, KANSAS.

GATE.

SPECIFICATION forming part of Letters Patent No. 593,939, dated November 16, 1897.

Application filed November 30, 1896. Serial No. 613,968. (No model.)

*To all whom it may concern:*

Be it known that I, LORENZO D. HOOPER, a citizen of the United States, residing at Coffeyville, in the county of Montgomery and State of Kansas, have invented certain new and useful Improvements in Gates; and I do hereby declare the following to be a full, clear, and exact description of the invention, such as will enable others skilled in the art to which it appertains to make and use the same.

This invention has reference to a novel construction in a gate and means for operating the same, the object being to provide a gate and supporting-frame whereby the necessity of setting posts into the ground is obviated, and, further, to provide means for opening and closing the gate a little distance therefrom—for instance, by means of a weight from a wheel of a vehicle.

The invention consists in the features of construction hereinafter fully described and claimed.

In the accompanying drawing, forming a part of this specification, is a perspective view of a gate and supporting-frame constructed in accordance with this invention with parts broken away for convenience of illustration.

Referring now to said drawing, 1 indicates the supporting-frame, consisting, essentially, of the longitudinal bars 2 and cross-pieces 3. The gate 4 is mounted over the center cross-piece, which conveniently extends a little distance beyond the outer longitudinal bars. Mounted upon the longitudinal bars 2 are the hinged post 5 and the latch-post 6. These posts are suitably braced by means of the braces 7, the outer or transverse brace being slotted at its lower end, whereby the lower end portion thereof can be adjusted to cause the gate to spring and lock in the correct manner. Mounted upon the center cross-piece 3 and between the posts 5 and 6 is the sill 8. The gate is hinged by means of an overhanging bracket 9 upon the hinge-post 5, that receives an upright pin 10 upon the gate. The lower end of the gate is provided with a downwardly-projecting pin 11, that extends through a slot 12 in the sill 8 in the usual manner. The gate is provided with a latch 13 to be held by a catch 14 upon the latch-post.

The gate is to be opened and closed by means of the shafts 15, situated on opposite sides of the gate and mounted upon the frame 1. The cranks 16 of these shafts 15 are so arranged that one of them on either side of the gate is in an upright position. For instance, in Fig. 1 the gate is shown as closed and the crank 16 at the left-hand side of the gate stands in an upright position, while the cranks at the right-hand side of the gate are practically horizontal. To open the gate, either one of the cranks at the left-hand side is forced downwardly, and it will be seen that this downward movement of the left-hand cranks to open the gate throws the right-hand cranks to an upright position. The shafts are connected by connecting-rods 17 with a rotatable gear-wheel 18, mounted upon the center cross-piece. A gear-pinion is mounted upon said center cross-piece and is connected by means of a spring-rod 20 with the upper end of the gate. It will be seen from the drawing that when the shafts are turned they cause the gear-wheel 18 to rotate, and consequently the gear-pinion, which by means of its connection with the gate, by reason of the spring rotating, turns the gate upon its pivot. The said spring-rod, it will be seen, serves to hold the gate open against the wind by reason of the location of the parts when the gate is open.

Devices are also arranged to automatically unlatch the gate when it is to be opened, and although it will be understood that various devices could be employed for this purpose yet as a preferred construction I place a cam 21 upon the gear-pinion 19, that is adapted to engage the lower end of the pin 11 at the bottom of the gate. This cam is so arranged that when the gear-pinion is turned to open the gate the cam strikes this pin 11 and moves it forward, which consequently lifts the spring end of the gate above the catch upon the post 6 and allows it to swing.

From the foregoing description it is seen that I provide a supporting-frame and gate so constructed that it can be placed upon the ground without the necessity of planting posts, and that, furthermore, said gate will operate either when elevated or at an inclination.

The parts are simple, inexpensive, and durable, and therefore are not liable to become out of order.

Having thus described my invention, what I claim as new, and desire to secure by Letters Patent, is—

The combination with a supporting-frame having posts, of a gate pivoted to one of said posts, a gear-pinion mounted upon said frame and having a cam situated to engage the lower end portion of said post, a spring-rod connected with said cam and said gate, a gear-wheel mounted upon said frame and intermeshing with said pinion, and shafts having cranks mounted upon said frame and connected with said gear-wheel.

In testimony whereof I have signed this specification in the presence of two subscribing witnesses.

LORENZO D. HOOPER.

Witnesses:
L. L. LANDON,
J. T. SANDEFUR.